US008645993B2

(12) United States Patent  
Perry

(10) Patent No.: US 8,645,993 B2  
(45) Date of Patent: Feb. 4, 2014

(54) METHODS AND APPARATUSES FOR DIRECTING RECIPIENTS OF VIDEO CONTENT ITEMS TO INTERESTING VIDEO CONTENT ITEMS

(75) Inventor: Guy Perry, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 12/116,764

(22) Filed: May 7, 2008

(65) Prior Publication Data

US 2009/0282436 A1  Nov. 12, 2009

(51) Int. Cl.
*H04N 7/10* (2006.01)
*H04N 7/025* (2006.01)
*H04N 7/16* (2011.01)
*H04B 1/18* (2006.01)
*H04B 1/40* (2006.01)

(52) U.S. Cl.
USPC .................. 725/35; 725/32; 725/46; 725/62; 455/77; 455/154.1

(58) Field of Classification Search
USPC ............. 725/37–40, 46, 51, 58, 9, 14, 25, 32, 725/34–35, 42, 48–49, 61–62, 100, 139, 725/151; 715/867; 455/77, 154.1, 414.1
See application file for complete search history.

(56) References Cited

U.S. PATENT DOCUMENTS

| | | | |
|---|---|---|---|
| 6,008,802 A | 12/1999 | Iki et al. | |
| 6,216,264 B1 | 4/2001 | Maze et al. | |
| 6,934,964 B1 * | 8/2005 | Schaffer et al. | 725/46 |
| 7,319,806 B1 | 1/2008 | Willner et al. | |
| 2001/0049826 A1 * | 12/2001 | Wilf | 725/120 |
| 2003/0149990 A1 * | 8/2003 | Anttila et al. | 725/105 |
| 2003/0221198 A1 * | 11/2003 | Sloo | 725/136 |

(Continued)

FOREIGN PATENT DOCUMENTS

| | | |
|---|---|---|
| CN | 1332927 A | 1/2002 |
| JP | 2003099554 | 4/2003 |
| WO | 0033573 | 6/2000 |

OTHER PUBLICATIONS

International Search Report, PCT/US2009/042332, International Searching Authority, European Patent Office, Aug. 28, 2009.

(Continued)

*Primary Examiner* — Hai V Tran  
(74) *Attorney, Agent, or Firm* — The Marbury Law Group, PLLC

(57) ABSTRACT

A method of directing a recipient of video content items employing a mobile device to at least one video content item of interest to the recipient comprises: storing a plurality of predetermined pattern identifiers and corresponding pattern data, the pattern identifiers and pattern data generated by reference to data predictive of recipient interest; detecting a predetermined pattern in at least one video content item by reference to the stored pattern data; and in response to the detection, transmitting an indication of the at least one video content item and the pattern identifier corresponding to the stored pattern data used to detect the predetermined pattern in the video content item to a plurality of mobile devices including the mobile device employed by the recipient, the indication directing the recipient to the video content item that is associated with the detected predetermined pattern that is of interest to the recipient. This allows users to follow desired live events without having to watch undesirable programming waiting for something interesting to happen.

42 Claims, 8 Drawing Sheets

(56) References Cited

U.S. PATENT DOCUMENTS

| | | | |
|---|---|---|---|
| 2004/0073915 A1* | 4/2004 | Dureau | 725/9 |
| 2005/0028219 A1* | 2/2005 | Atzmon et al. | 725/116 |
| 2007/0035664 A1 | 2/2007 | Kamada | |
| 2007/0271582 A1 | 11/2007 | Ellis et al. | |
| 2007/0300250 A1 | 12/2007 | Smith et al. | |
| 2008/0052739 A1 | 2/2008 | Logan | |
| 2009/0049490 A1* | 2/2009 | White | 725/100 |
| 2009/0119710 A1* | 5/2009 | Lo et al. | 725/39 |

OTHER PUBLICATIONS

Written Opinion, PCT/US2009/042332, International Searching Authority, European Patent Office, Aug. 28, 2009.

* cited by examiner

SELECT LOGICAL EVENTS:

```
NEWS
      LIVE EVENTS
            CAR CHASES
            NATURAL DISASTERS
            POLITICAL EVENTS
      REPORTS
            CELEBRITIES    [ENTER NAMES]
      WEATHER              [ZIP CODE]
            ADVISORIES
            FORECASTS
                  TODAY
                  5 DAY
                  SKI FORECAST
                  SURF FORECAST
SPORTS
      LIVE EVENTS
            GOLF
            NFL
            COLLEGE FOOTBALL
            BASEBALL
      SCORES
```

METHODS AND APPARATUSES FOR DIRECTING RECIPIENTS OF VIDEO CONTENT ITEMS TO INTERESTING VIDEO CONTENT ITEMS

TECHNICAL FIELD

This application generally relates to data communications, and more specifically, to communication of multimedia data.

BACKGROUND

Electronic devices such as mobile telephone handsets and other mobile devices may be configured to receive broadcasts of sports, entertainment, advertisements, or other informational multimedia content items. For example, video content items may be communicated using a broadcast communications link to the electronic devices. There is a need to provide a recipient of video content items an enhanced viewing experience on such devices.

SUMMARY

In certain embodiments, a method of directing a recipient of video content items employing a mobile device to at least one video content item of interest to the recipient comprises: storing a plurality of predetermined pattern identifiers and corresponding pattern data, the pattern identifiers and pattern data generated by reference to data predictive of recipient interest; detecting a predetermined pattern in at least one video content item by reference to the stored pattern data; and in response to the detection, transmitting an indication of the at least one video content item and the pattern identifier corresponding to the stored pattern data used to detect the predetermined pattern in the video content item to a plurality of mobile devices including the mobile device employed by the recipient, the indication directing the recipient to the video content item that is associated with the detected predetermined pattern that is of interest to the recipient.

In certain embodiments, a method of filtering video content items on a mobile device comprises: receiving at least one notification message, the message including a pattern identifier and a channel identifier; in response to the pattern identifier matching a pattern identifier previously stored in the mobile device, displaying the at least one notification message; and providing an interface for a user of the mobile device to tune the mobile device to a channel associated with the channel identifier.

In certain embodiments, a method of filtering video content items on a mobile device comprises: receiving an alert message indicating transmission of at least one video content item; displaying the alert message; and tuning the mobile device to a channel associated with the alert message.

In certain embodiments, a method of filtering video content items on a mobile device comprises: retrieving a user profile from the mobile device; retrieving a content identifier from broadcast streams of the video content items; comparing the content identifier with the user profile; and in response to the content identifier matching the user profile, displaying an indication to the user that a content item matching the user profile is being broadcast.

In certain embodiments, an apparatus for directing a recipient of video content items employing a mobile device to at least one video content item of interest to the recipient comprises: a database storing a plurality of predetermined pattern identifiers and corresponding pattern data, the pattern identifiers and pattern data generated by reference to data predicative of recipient interest; a processor configured to detect a predetermined pattern in at least one video content item by reference to the stored pattern data; and a transmitter configured to, in response to the detection, transmit an indication of the at least one video content item and the pattern identifier corresponding to the stored pattern data used to detect the predetermined pattern in the video content item to a plurality of mobile devices including the mobile device employed by the recipient, the indication directing the recipient to the video content item that is associated with the detected predetermined pattern that is of interest to the recipient.

In certain embodiments, an apparatus of filtering video content items on a mobile device comprises: a receiver configured to receive at least one notification message, the message including a pattern identifier and a channel identifier; a display configured to display the at least one notification message in response to the pattern identifier matching a pattern identifier previously stored in the mobile device; and a processor configured to provide an interface for a user of the mobile device to tune the mobile device to a channel associated with the channel identifier.

In certain embodiments, an apparatus of filtering video content items on a mobile device comprises: a receiver configured to receive an alert message indicating transmission of at least one video content item; a display configured to display the alert message; and a processor configured to tune the mobile device to a channel associated with the alert message.

In certain embodiments, an apparatus of filtering video content items on a mobile device comprises a processor that is configured to: retrieve a user profile from the mobile device; retrieve a content identifier from broadcast streams of the video content items; compare the content identifier with the user profile; and in response to the content identifier matching the user profile, display an indication to the user that a content item matching the user profile is being broadcast.

In certain embodiments, an apparatus for directing a recipient of video content items employing a mobile device to at least one video content item of interest to the recipient comprises: means for storing a plurality of predetermined pattern identifiers and corresponding pattern data, the pattern identifiers and pattern data generated by reference to data predicative of recipient interest; means for detecting a predetermined pattern in at least one video content item by reference to the stored pattern data; and means for, in response to the detection, transmitting an indication of the at least one video content item and the pattern identifier corresponding to the stored pattern data used to detect the predetermined pattern in the video content item to a plurality of mobile devices including the mobile device employed by the recipient, the indication directing the recipient to the video content item that is associated with the detected predetermined pattern that is of interest to the recipient.

In certain embodiments, an apparatus of filtering video content items on a mobile device comprises: means for receiving at least one notification message, the message including a pattern identifier and a channel identifier; means for, in response to the pattern identifier matching a pattern identifier previously stored in the mobile device, displaying the at least one notification message; and means for providing an interface for a user of the mobile device to tune the mobile device to a channel associated with the channel identifier.

In certain embodiments, an apparatus of filtering video content items on a mobile device comprises: means for receiving an alert message indicating transmission of at least one video content item; means for displaying the alert message; and means for tuning the mobile device to a channel associated with the alert message.

In certain embodiments, an apparatus of filtering video content items on a mobile device comprises: means for retrieving a user profile from the mobile device; means for retrieving a content identifier from broadcast streams of the video content items; means for comparing the content identifier with the user profile; and means for, in response to the content identifier matching the user profile, displaying an indication to the user that a content item matching the user profile is being broadcast.

Methods and apparatuses of the disclosure each have several embodiments. No single one of the embodiments is solely responsible for its desirable attributes. Without limiting the scope of this invention, for example, as expressed by the claims which follow, its more prominent features will now be discussed briefly. After considering this discussion, and particularly after reading the section entitled "Detailed Description" one will understand how the features of this invention provide advantages that include allowing a content provider to transmit content data to more mobile devices in more efficient ways.

BRIEF DESCRIPTION OF THE DRAWINGS

FIG. 8 illustrates an example of a user interface for facilitating a portion of the method of FIG. 4.

DETAILED DESCRIPTION

Figure 1:
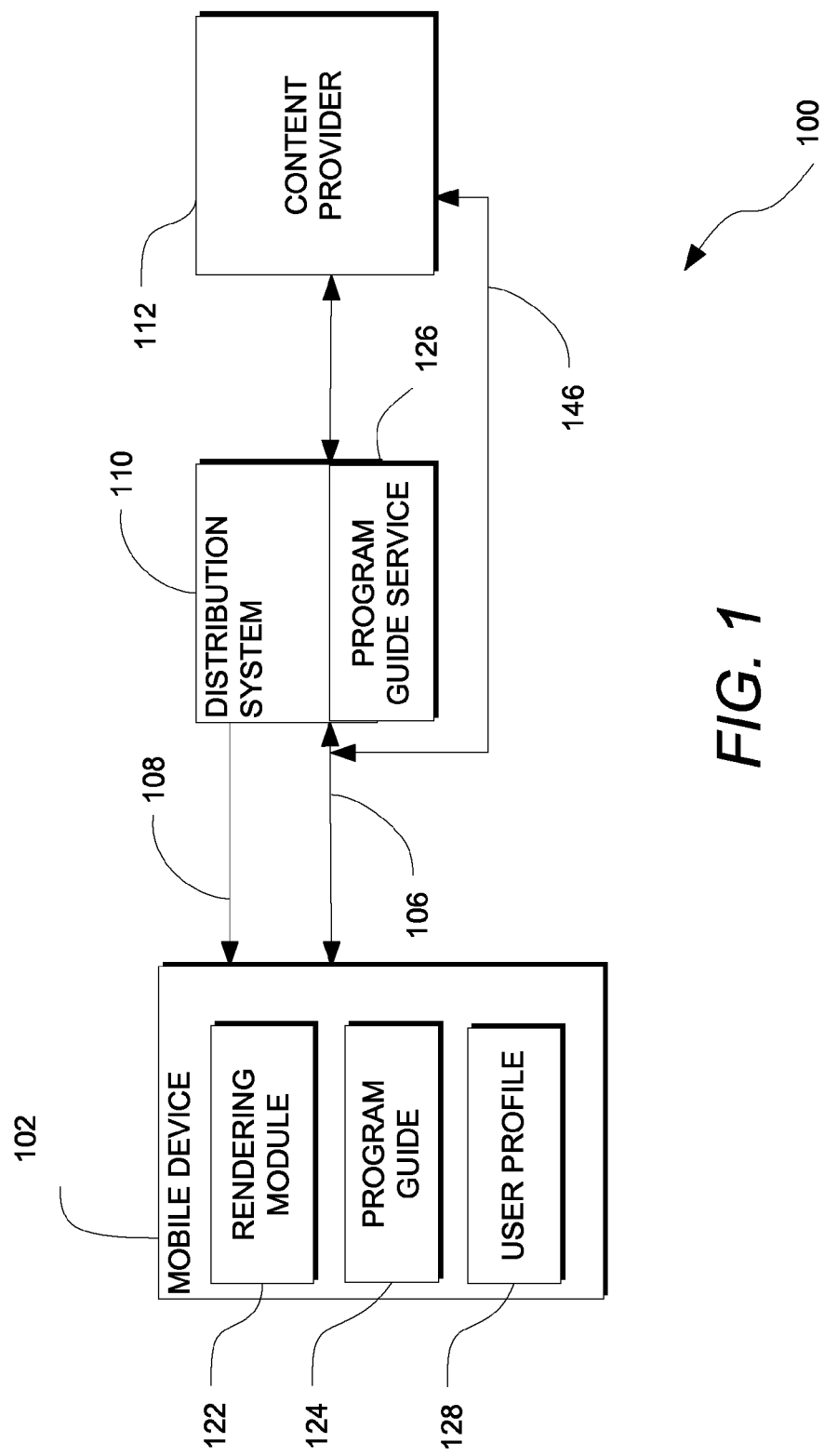
FIG. 1 is a block diagram illustrating an exemplary system for providing broadcast content items to mobile devices.

The following detailed description is directed to certain embodiments of the disclosure. However, the invention can be embodied in a multitude of different ways, for example, as defined and covered by the claims. The embodiments herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented or a method may be practiced using any number of the embodiments set forth herein. In addition, such an apparatus may be implemented or such a method may be practiced using other structure, functionality, or structure and functionality in addition to or other than one or more of the embodiments set forth herein.

Program guides provide a way for users to identify and select content of interest when receiving broadcast video content items. However, program guides generally do not have updated data regarding the actual content that is broadcast, but rather, include a general description of a program. For example, regularly broadcast news programs generally do not include a detailed description of their content in the program guide as the content may not be set until the time of the broadcast. Similarly, unscheduled broadcasts may include particular content that could not be identified in time for inclusion in a program guide. Moreover, even where a program guide may include details of the particular content, the presentation timing of such content within the broadcast may not be identifiable based on the program guide information. For example, a news show may have a program guide entry that lists the subjects to be covered but not their particular order and timing within the broadcast. Therefore, recipients are generally relegated to passively watching video, such as a sporting event, and wait for something interesting to happen. Embodiments provide a way of notifying recipients of video content items just before or just after something that has been identified as interesting occurs in the video content so as to draw attention to one or more video content items of interest to the recipients.

One embodiment includes a server operation and a device operation. The server stores a plurality of pattern identifiers and corresponding pattern data which are generated by reference to data predictive of recipient interest. The server then detects predetermined patterns in the broadcast video content item by reference to the stored pattern data, and, in response to the detection, transmits to a plurality of mobile devices an indication of the broadcast video content item and the identified pattern identifier. In the device, after receipt of the indication of the broadcast video content item and the pattern identifier, the device determines if the pattern is one that is of interest to the user. If the pattern is of interest to the user, the user may choose to tune the mobile device to the channel in which the video content item is being broadcast. Accordingly, in this embodiment, at the mobile device, a content identifier is retrieved from the broadcast streams of video content items, and then compared with a user profile stored in the mobile device. In response to the content identifier matching the user profile, an indication is displayed on the mobile device notifying the user that a video content item matching the user profile is being broadcast.

FIG. 1 is a block diagram illustrating an exemplary system 100 for providing broadcast content items to mobile devices 102 from one or more content providers 112 using a distribution system 110. While a single mobile device 102 is shown in FIG. 1, an exemplary system 100 may be configured to use any number of mobile devices 102. The system 100 also includes a distribution system 110 and a content provider 112. The distribution system 110 may receive data representing a multimedia content item from the content provider 112. The multimedia content items may be communicated over a wired or wireless content item communication link 108. The advertisements may also be communicated over a separate wired or wireless communication link that is different from the wired or wireless content item communication link 108. In one embodiment, the communications link 108 is a high speed or broadband link. In one embodiment, the content provider 112 communicates content directly over a second wireless or wired link 146 to the mobile device 102, bypassing the distribution system 110. It is to be recognized that in other embodiments multiple content providers 112 may provide content items using multiple distribution systems 110 to the mobile devices 102.

In the exemplary system 100 of FIG. 1, the content item communication link 108 is illustrated as a unidirectional network. However, the content item communication link 108 may also be a fully symmetric bi-directional network. The content item communication link 108 may comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, Mobile-Originated Short Message Service (MO-SMS) system, a 3G data network system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

In the exemplary system 100, the mobile device 102 may also be configured to communicate on a third communication link 106 which may comprise any of the networks described above with reference to the link 108. In one embodiment, the communication link 106 is a two way communication link such as is illustrated in the exemplary system 100. The communication link 106 may be used in communication between the mobile device 102 and the broadcast center or distribution system 110 and/or the content provider 112. In one embodiment, the distribution system 110 is a broadcast center. The third communication link 106 may be a wireless network configured to communicate voice traffic and/or data traffic. The communication link 106 may communicate program guide and other data between the distribution system 110 and the mobile device 102.

The mobile device 102 includes a rendering module 122 configured to render the multimedia content items received over the content item communication link 108. The rendering module 122 may include analog and/or digital technologies. The rendering module 122 may include one or more multimedia signal processing systems, such as video encoders/decoders, using encoding/decoding methods based on international standards such as MPEG-x and H.26x standards. Such encoding/decoding methods generally are directed towards compressing the multimedia data for transmission and/or storage.

In addition to communicating content items to the mobile device 102, the distribution system 110 may also include a program guide service 126. The program guide service 126 receives program schedule and content related data from the content provider 112 and/or other sources and communicates data representing an electronic programming guide (EPG) 124 to the mobile device 102. The EPG 124 may include data related to the broadcast schedule of multiple content items available to be received over the content item communication link 108. The EPG data may include titles of content items, start and end times, category classification of content items (e.g., sports, movies, comedy, etc.), quality ratings, adult content ratings, etc. The EPG 124 may also be communicated to the mobile device 102 over the content item communication link 108 and stored in the mobile device 102.

Mobile devices such as mobile handsets and music/video players are often used by a particular user. Therefore, the mobile device 102 can also include a user profile 128. For example, the user profile 128 may be configured to store information indicative of content items selected for viewing by a user. In one embodiment, the user profile 128 stores data indicative of one or more content items that will be, or have been, viewed, recorded, or otherwise accessed by the user. The profile may be updated based on data indicative of accessed content items, a category associated with the accessed content items, an elapsed viewing time of the accessed content items, and a channel associated with the content items.

Figure 2:
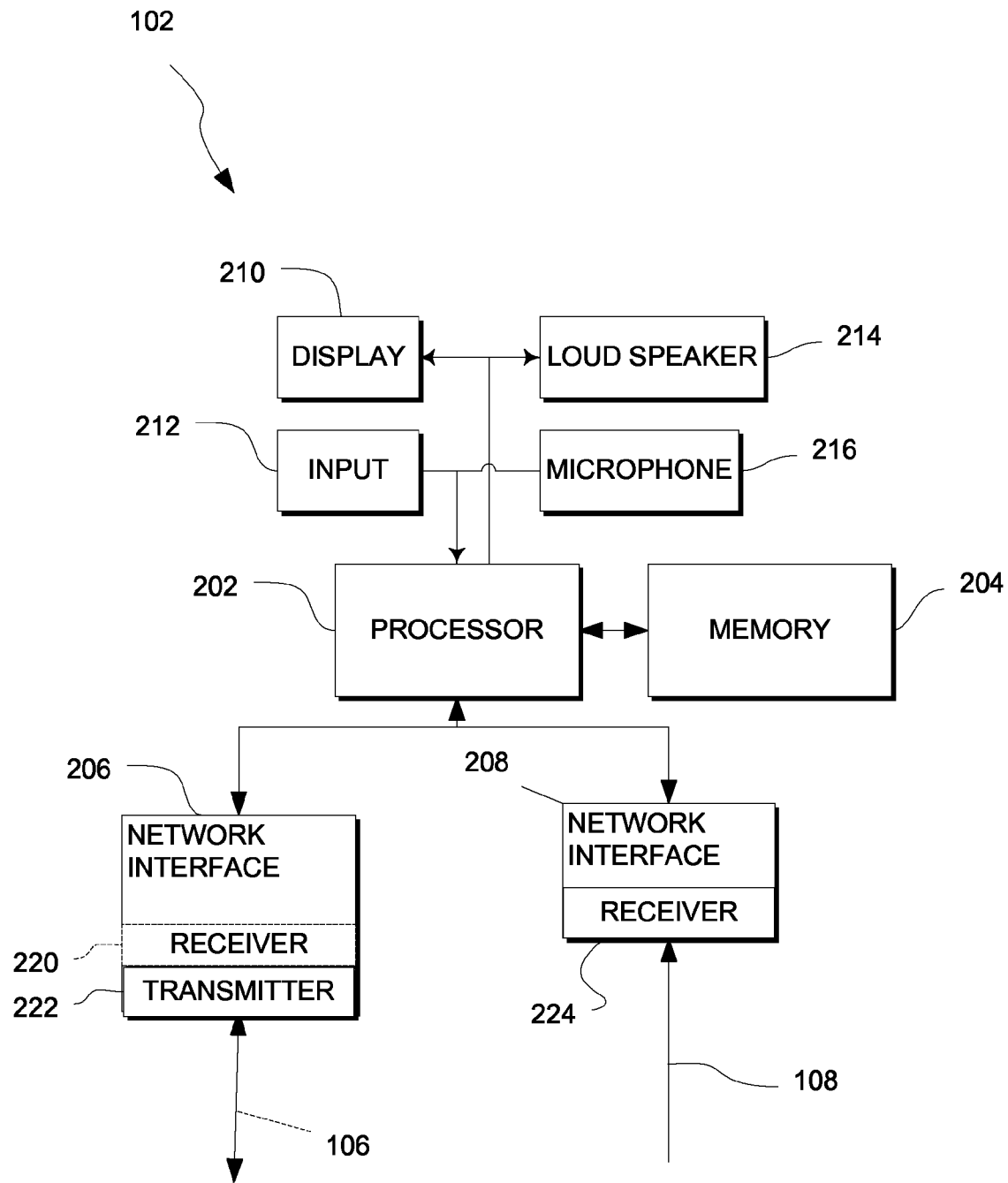
FIG. 2 is a block diagram illustrating an example of a mobile device such as illustrated in FIG. 1.

FIG. 2 is a block diagram illustrating an example of the mobile device 102 such as illustrated in FIG. 1. The mobile device 102 includes a processor 202 that may be in communication with a memory (or storage device) 204 and a network interface 208 that communicates over the content item communication link 108. The network interface 208 includes a receiver 224 configured to access the unidirectional content item communication link 108. The network interface 208 and the receiver 224 may employ signals according to wired technologies which are the same as or similar to those for the content item communication link 108.

The mobile device 102 may include an optional second network interface 206 for communicating using the bi-directional communication link 106. The network interface 206 may include any suitable antenna (not shown), a receiver 220, and a transmitter 222 so that the mobile device 102 can communicate with one or more devices over the bi-directional communication link 106.

The mobile device 102 may also includes one or more of a display 210, a user input device 212 such as a key, touch screen, or other suitable tactile input device, a loudspeaker 214 comprising a transducer adapted to provide audible output based on a signal received over the communication link 106 and/or a microphone 216 comprising a transducer adapted to provide audible input of a signal that may be transmitted over the communication links 106 or 108.

The mobile device 102 may comprise at least one of a mobile handset, a personal digital assistant, a laptop computer, a headset, a vehicle hands free device, or any other electronic device. For example, one or more embodiments taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device.

The components described herein may be implemented in a variety of ways. Referring to FIG. 2, the mobile device 102 may be represented as a series of interrelated functional blocks that may represent functions implemented by, for example the processor 202, software (not shown), some combination thereof, or in some other manner as taught herein. For example, the processor 202 may facilitate user input using the input devices 212. Further, the transmitter 222 may comprise a processor (not shown in FIG. 2) that provides various functionalities relating to transmitting information, for example, to another mobile device 102, or to an email address of a user. Also, the receivers 220 or 224 may comprise a processor (not shown in FIG. 2) to provide various functions relating to receiving information, in example, from another mobile device 102.

In some embodiments, the device or apparatus 102 comprises an integrated circuit ("IC"). Thus, the integrated circuit may comprise one or more processors that provide the functionality of the processor components illustrated in FIG. 2. For example, in some embodiments a single processor implements the functionality of the illustrated processor components, while in other embodiments more than one processor implements the functionality of the illustrated processor components. In addition, in some embodiments the integrated circuit comprises other types of components that implement some or all of the functionality of the illustrated processor components.

Any illustrative logical blocks, modules, and circuits described in connection with the embodiments disclosed herein may be implemented within or performed by an integrated circuit, an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 3:
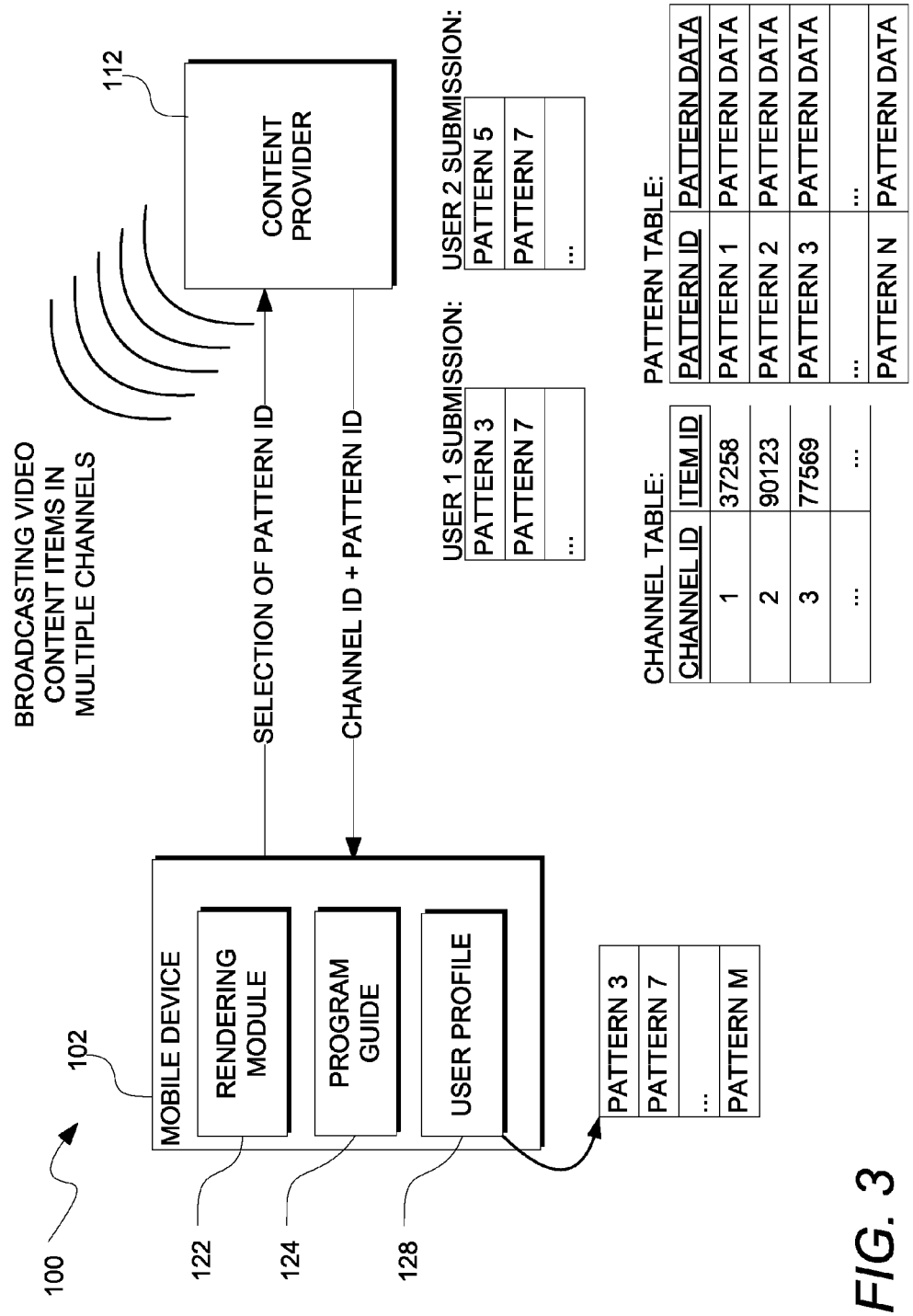
FIG. 3 is a block diagram illustrating an embodiment of a system for providing video content items to mobile devices.

FIG. 3 is a block diagram illustrating an embodiment of a system for providing video content items to mobile devices. In FIG. 3, like parts are numbered similarly with respect to FIG. 1. As illustrated in FIG. 3, the content provider 112 broadcast, in multiple channels, video content data to a plurality of mobile devices including the mobile device 102. The mobile device 102 stores a collection of pattern identifiers. The collection of pattern identifiers can be stored anywhere internal or external to the mobile device 102. The example in FIG. 3 illustrates that a collection of pattern identifiers such as Pattern 3, Pattern 7, . . . , Pattern M are stored within the user profile 128. Each of the stored pattern identifiers is preferably selected by the user of the mobile device 102 through a user interface. The user interface displays a plurality of logical events which may be included in a plurality of video content items, from which the user selects one or more logical events in which the user is interested. After the user selects one or more logical events, the mobile device 102 updates the collection of selected pattern identifiers with pattern identifiers corresponding to the logical events selected by the user. An example of such a user interface is illustrated in FIG. 8 and will be described in detail herein.

As illustrated in FIG. 3, in one embodiment, the pattern identifier selections are transmitted to the content provider. Accordingly, the mobile device 102 transmits the selection of pattern identifiers to the content provider 112. Correspondingly, the content provider 112 maintains a submission of pattern identifiers from each subscribing mobile device. The example in FIG. 3 illustrates that two submissions, i.e., "User 1 Submission" and "User 2 Submission" have been received from User 1 and User 2. User 1 Submission illustrates that User 1 has selected Pattern 3, Pattern 7, etc. User 2 Submission illustrates that User 2 has selected Pattern 5, Pattern 7, etc.

In this embodiment, the content provider 112 also maintains a cross-reference table for storing a plurality of pattern identifiers and the corresponding pattern data. The example in FIG. 3 illustrates that a cross-reference table "Pattern Table" stores pattern data for Pattern 1, Pattern 2, Pattern 3, . . . , and Pattern N. For each pattern identifier, the corresponding pattern data include video data characterizing the corresponding logical event. As described above, the pattern identifiers may be provided to the user through a user interface, an example of which is illustrated in FIG. 8, so that the user selects one or more identified logical events.

The content provider 112 further maintains a cross-reference table for storing a plurality of channel identifiers and corresponding video content item identifiers such as those in an electronic program guide (EPG). Each video content item identifier identifies a video content item that is being broadcast in a channel associated with the corresponding channel identifier. In the example as illustrated in FIG. 3, the cross-reference table "Channel Table" illustrates that Video Content Item 37258 is being broadcast in Channel 1, Video Content Item 90123 in Channel 2, Video Content Item 77569 in Channel 3, etc.

In one embodiment, the content provider 112 monitors video content item data so as to detect a predetermined pattern in the video content items by reference to the user submitted pattern identifiers and the pattern data corresponding to the submitted pattern identifiers. In another embodiment, the content provider 112 monitors pattern data for all pattern identifiers without regard to user selections. In one embodiment, once the content provider 112 detects a predetermined pattern in the video content items, the content provider 112 notifies a plurality of mobile devices. Alternatively, the content provider 112 notifies a particular mobile device of information regarding the channel identifier of the broadcasting channel and/or the pattern identifier corresponding to the detected predetermined pattern. After receipt of the information regarding the channel identifier and/or the pattern identifier, the mobile device may be tuned, either automatically or in response to an input from the user, to the broadcasting channel associated with the channel identifier so as to render the broadcast video content item of interest to the user.

Figure 4:
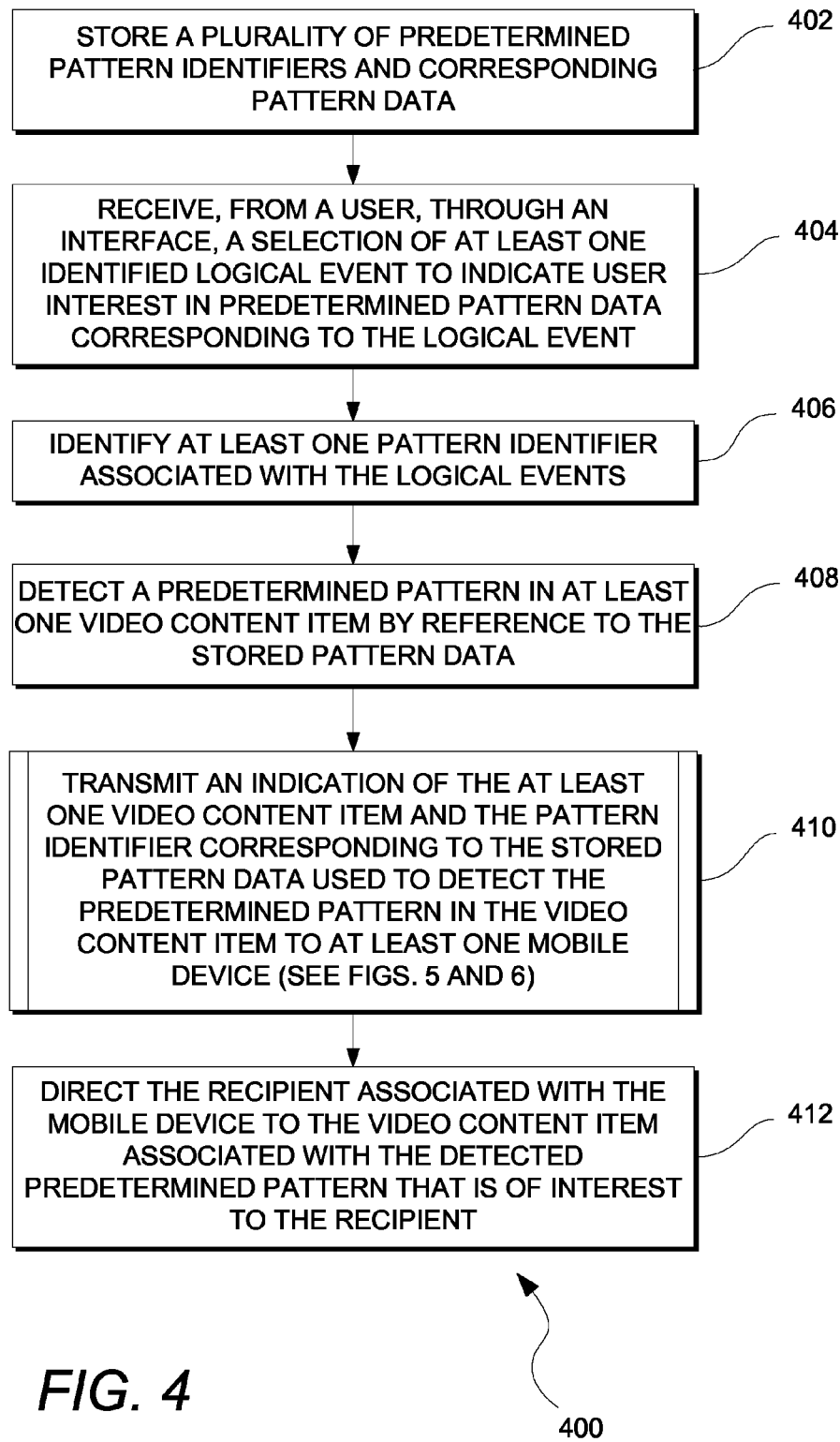
FIG. 4 is a flowchart illustrating an example of a method of directing a recipient of video content items to at least one video content item of interest in a broadcast network.

FIG. 4 is a flowchart illustrating an example of a method 400 for directing a recipient of video content items employing a mobile device as illustrated in FIG. 2 to at least one video content item of interest to the recipient in the broadcast network as illustrated in FIG. 3. As illustrated in FIG. 4, method 400, which may be performed using an embodiment of the system 100, starts at block 402. At block 402, method 400 includes storing a plurality of predetermined pattern identifiers and corresponding pattern data. In one embodiment, the plurality of predetermined pattern identifiers and corresponding pattern data are stored in a cross-reference table "Pattern Table" as illustrated in FIG. 3.

At block 404, method 400 includes receiving, from a user and through an interface, a selection of at least one identified logical event to indicate user interest in predetermined pattern data corresponding to the logical event. An example of such an interface is illustrated in FIG. 8. As described later with reference to FIG. 8, a logical event may be a high level logical event such as "News" or "Sports" or a subcategory of logical events such as "Live Event" or "Weather" at a certain zip code. It may also be an event regarding a certain celebrity. Other examples of logical events include car chases, fire, home run just hit, start of eight inning, no hitter in progress, touchdown scored, etc.

At block 406, method 400 includes identifying at least one pattern identifier associated with the logical events. In one embodiment as illustrated in FIG. 3, a plurality of logical events are selected by User A and these logical events are identified as Pattern 3, Pattern 7, . . . , and Pattern M.

At block 408, method 400 includes detecting a predetermined pattern in at least one video content item by reference to the stored pattern data. In one embodiment as illustrated in FIG. 3, the pattern data are stored in table "Pattern Table." For each identified pattern identifier, the content provider 112 uses the corresponding pattern data saved in table "Pattern Table" to detect a corresponding pattern in the video content items being broadcast. The content provider 112 dynamically searches the video content items being broadcast for the corresponding pattern data, i.e., set of events defining a pattern or logical event. Such parameters may comprise certain visual characteristics of certain objects and/or certain scenes as well as certain relationships among certain objects and/or scenes. In such embodiments, the content provider 112 dynamically searches the video content items being broadcast for patterns that fall within the parameters as defined by corresponding pattern data. For example, for the "Car Chases" pattern as indicated in FIG. 8, the parameters defined by corresponding pattern data may include how many vehicles appear on the screen display during a certain period of time, how fast these vehicles move, whether a police vehicle is included, etc. In this example, the content provider 112 dynamically monitors the video content items being broadcast, identifies any vehicles that are displayed in the video content items, and determines whether these vehicles satisfy the parameters as defined by pattern data corresponding to "Car Chases" pattern. Other patterns are derived from audio or close captioning information.

At block 410, method 400 includes transmitting an indication of the at least one video content item and the pattern identifier corresponding to the stored pattern data used to detect the predetermined pattern in the video content item to at least one mobile device. Many variations may be made to the process in block 410. Some of these variations are described in detail with respect to FIGS. 5 and 6.

At block 412, method 400 includes directing the recipient associated with the mobile device to the video content item associated with the detected predetermined pattern that may be of interest to the recipient. For example, as illustrated in FIG. 3, if a pattern corresponding to the pattern data (stored in "Pattern Table") which corresponds to Pattern 7 has been detected by the content provider 112 in a video content item, the content provider 112 transmits an indication of where the content item is being transmitted and Pattern 7 to both the mobile device of User 1 and the mobile device of User 2.

Figure 5:
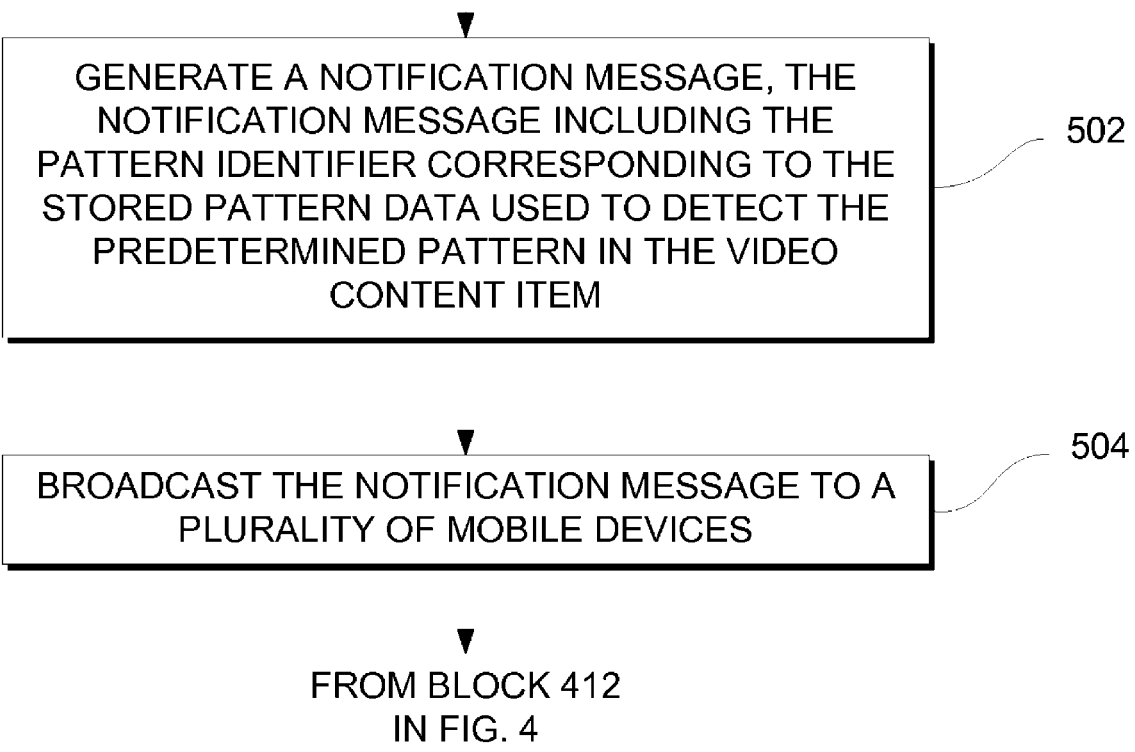
FIG. 5 illustrates a variation to the flowchart as illustrated in FIG. 4.

FIG. 5 illustrates a variation to the flowchart as illustrated in FIG. 4. As illustrated in FIG. 5, method 500 includes acts and events associated with block 408 in FIG. 4. At block 502, method 500 includes generating a notification message. The notification message includes the pattern identifier corresponding to the stored pattern data used to detect the predetermined pattern in the video content item. At block 504, method 500 includes broadcasting the notification message to a plurality of mobile devices. Method 500 then proceeds to block 412 in FIG. 4.

Figure 6:
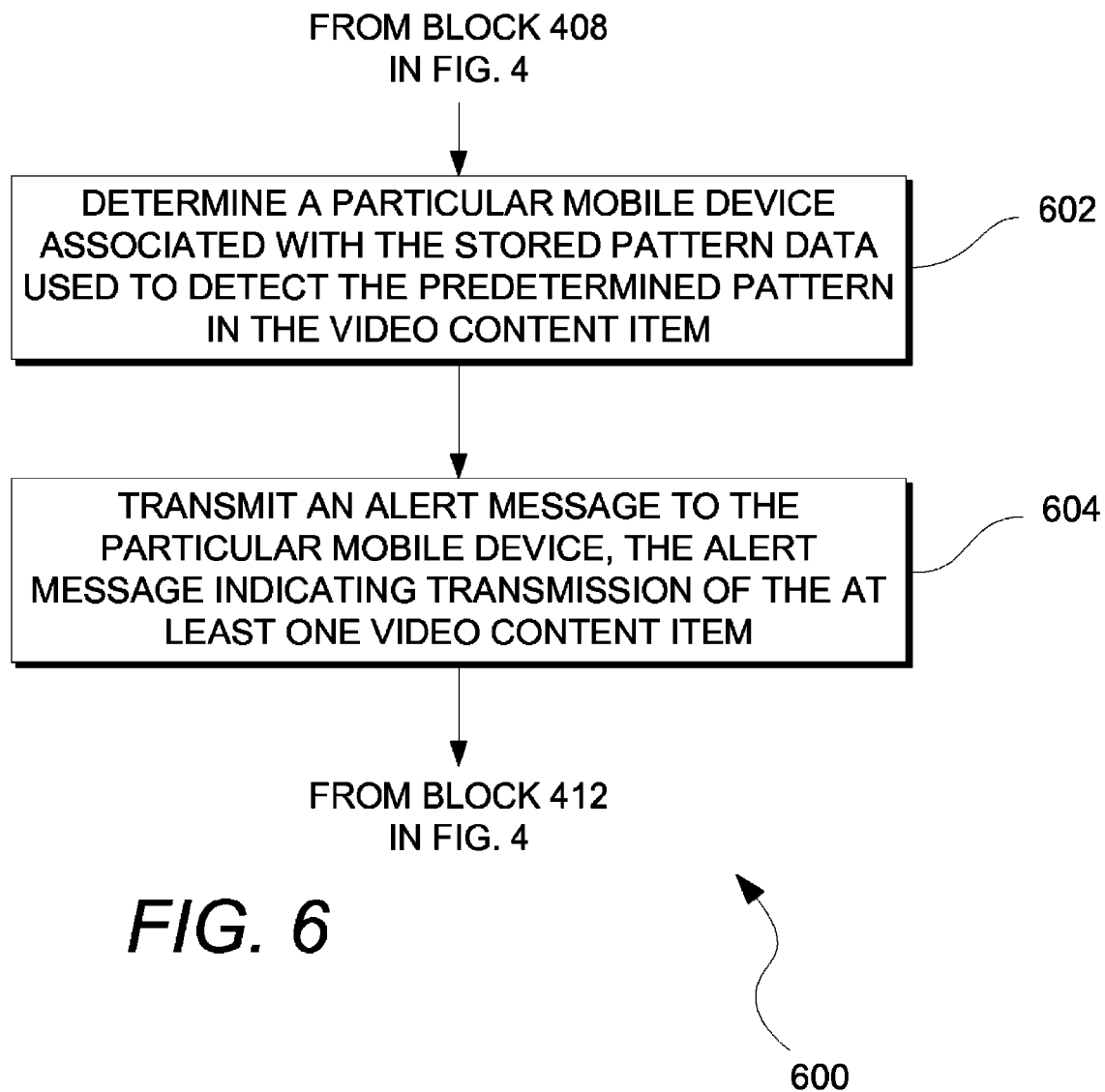
FIG. 6 illustrates another variation to the flowchart as illustrated in FIG. 4.

FIG. 6 illustrates another variation to the flowchart as illustrated in FIG. 4. As illustrated in FIG. 6, method 600 includes acts and events associated with block 408 in FIG. 4. At block 602, method 600 includes determining a particular mobile device associated with the stored pattern data used to detect the predetermined pattern in the video content item. At block 604, method 600 includes transmitting an alert message to the particular mobile device. The alert message includes an indication of the at least one video content item. Method 600 then proceeds to block 412 in FIG. 4.

In one embodiment, the steps as illustrated by blocks 402 to 412 in FIG. 4, blocks 502 and 504 in FIG. 5, and blocks 602 and 604 in FIG. 6 are performed by the content provider 112 as illustrated in FIG. 3. In other embodiments, some or all of these steps are implemented by one or more components internal or external to the content provider 112. Each of these components may be a combination of hardware and software.

Figure 7:
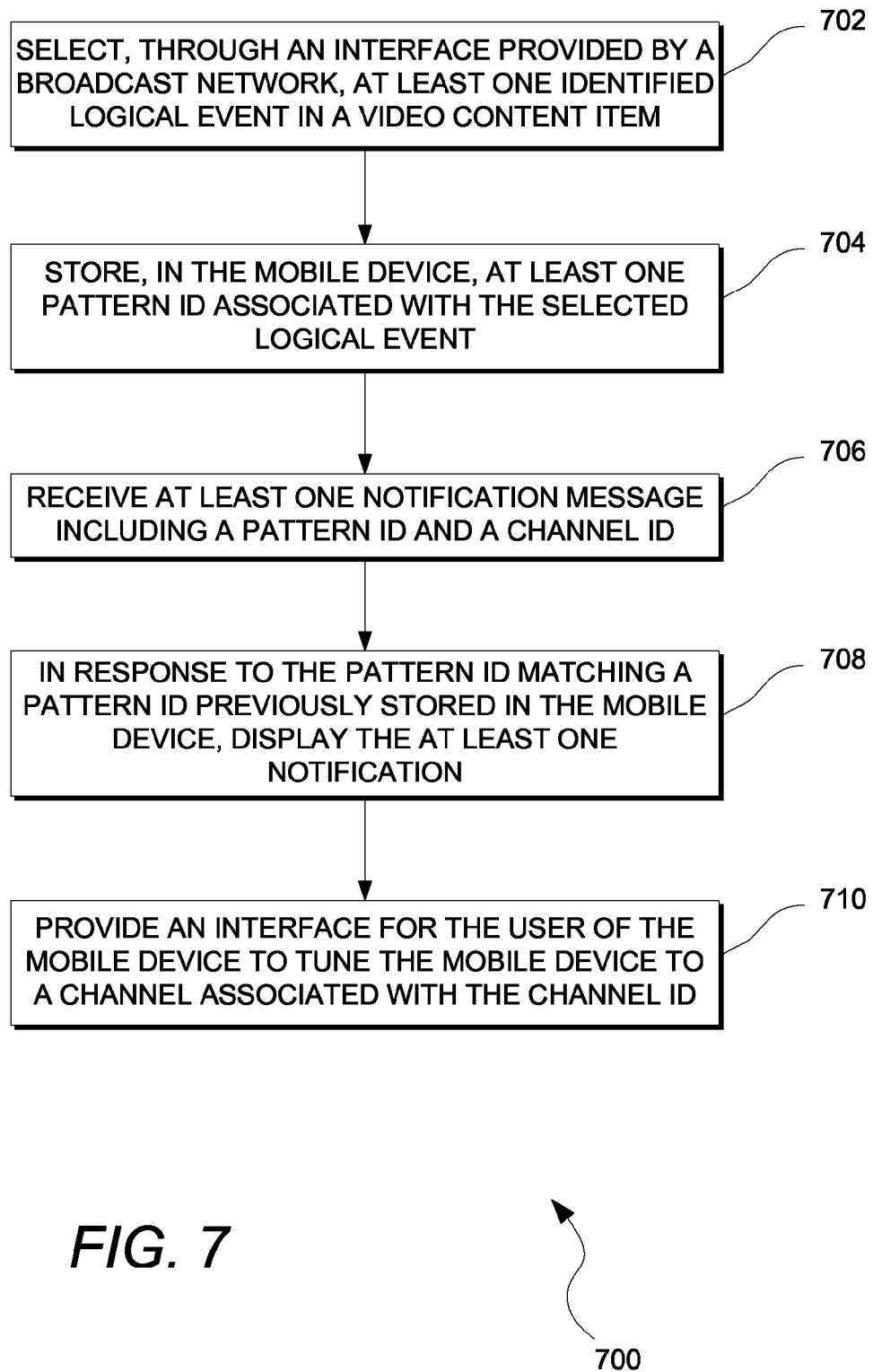
FIG. 7 is a flowchart illustrating an example of a method of filtering video content items on a mobile device as illustrated in FIG. 2.

FIG. 7 is a flowchart illustrating an example of a method 700 of filtering video content items on a mobile device as illustrated in FIG. 2 or 3. As illustrated in FIG. 7, method 700, which may be performed using an embodiment of the system 100, starts at block 702, which includes selecting, through a user interface provided by a broadcast network, at least one identified logical event which may be associated with a video content item. An example of such a user interface is illustrated in FIG. 8 and will be described in detail later. At block 704, method 700 includes storing, in the mobile device, at least one pattern identifier associated with the selected logical event. In one embodiment as illustrated in FIG. 3, a plurality of pattern identifiers such as Pattern 3, Pattern 7, . . . , Pattern M associated with the selected logical events are stored in the user profile 128 of the mobile device 102.

At block 706, method 700 includes receiving at least one notification message, for example, from the content provider 112. The notification message includes a pattern identifier and a channel identifier. At block 708, in response to the pattern identifier matching a pattern identifier previously stored in the mobile device, for example, in the user profile 128 as illustrated in FIG. 3, method 700 includes displaying the at least one notification. At block 710, method 700 includes providing an interface for the user of the mobile device to tune the mobile device to a channel associated with the channel identifier.

In one embodiment, the steps as illustrated by blocks 702 to 710 in FIG. 7 in FIG. 7 are performed by the mobile device 102 as illustrated in FIG. 3. In other embodiments, some or all of these steps are implemented by one or more components internal or external to the mobile device 102. Each of these components may be a combination of hardware and software.

In one embodiment, a method of filtering video content items on a mobile device directs the mobile device to receive an alert message indicating transmission of at least one video content item. Then, the method displays the alert message on the mobile device and the device is then tuned to a channel associated with the alert message. The tuning can be performed either automatically or in response to an input from the user. The method also selects, through an interface provided by the broadcast network, an identified logical event in a video content item. The identified logical event is associated with the alert message.

In another embodiment, a method of filtering video content item on a mobile device retrieves a user profile from the mobile device. The method also retrieves a content identifier from the broadcast streams of the video content items. Then, the method compares the content identifier with the user profile. In response to the content identifier matching the user profile, the method displays an indication to the user that a content item matching the user profile is being broadcast. The method also tunes the mobile device to a channel in which the video content item associated with the content identifier is being broadcast. The tuning can be performed either automatically or in response to an input from the user. The method also selects, through an interface provided by a broadcast network, an identified logical event in the content item, and stores an entry associated with the identified logical event in the user profile.

FIG. 8 illustrates an example of a user interface 800 provided by the mobile device 102 as illustrated in FIG. 1, 2 or 3, for selecting logical events of interest to a particular user of the mobile device 102. In one embodiment, the user interface 800 allows users of the mobile device 102 to edit an entry in the user profile 128 of the mobile device 102. The example interface 800 illustrates a hierarchy of logical events that the user may select to add (or deselect to remove) from their profile. For example, the user can select high level logical events such as "News" or "Sports" so that their mobile device 102 tunes to such video content items whenever indications of such video content items and pattern identifiers corresponding to the selected logical events are received. To better focus on content items of interest to the viewer, subcategories may be selected, such as selecting for a "News" events category from "Live Events," "Reports," or "Weather." More detailed subcategories such as "Celebrities" may further include a text entry box or submenu (not shown) for identifying particular celebrities in a free-form field. Thus, a user may enter or select one or more names such as "Thomas Jefferson" and be notified of news reports related to Thomas Jefferson. Other categories of logical events may also have associated filter data, e.g., the "Weather" category may be associated with a zip code or region of interest to the user. The information from the user interface 800, or other sources of user profile information such as past viewed data, may be stored in the user profile 128 in any suitable format or data structure. For example, the logical events may be stored in an entry in the user profile 128 as text or other data indicative of text of a particular category that can be matched to the pattern identifier in the indication received from the content provider 112.

The apparatuses and methods described herein may be used to notify mobile device users of interesting logical events in video content items whenever these logical events happen in certain channels. These apparatuses and methods allow users to follow desired live events without having to watch undesirable programming waiting for something interesting to happen. A logical program progression alert system based on the apparatuses and methods described herein allows users to specify a desired logical event during which to receive broadcast of the logical event. This allows users to watch desired content by reference to real time live event progression which cannot be predicted from a program guide.

While the above detailed description has shown, described, and pointed out novel features of the invention as applied to various embodiments, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

The invention claimed is:

1. A method of providing video content items to a plurality of mobile devices, comprising:
storing a plurality of predetermined pattern identifiers and corresponding pattern data, wherein the pattern identifiers and pattern data are generated by reference to data predictive of recipients' interest, and wherein the pattern data comprises visual or audio characteristics of video content items;
dynamically searching video content items in current broadcast for predetermined patterns defined by stored pattern data;
detecting a predetermined pattern in at least one video content item by determining that content of the at least one video content item in current broadcast has visual or audio characteristics matching stored pattern data; and
in response to detecting the predetermined pattern, transmitting a notification message of the at least one video content item to the plurality of mobile devices, wherein the notification message comprises:
a pattern identifier associated with the matching stored pattern data; and
a channel identifier associated with the at least one video content item, wherein the notification message allows each of the plurality of mobile devices to:
determine whether the pattern identifier matches a user-selected pattern identifier stored in that mobile device; and
automatically tune to the at least one video content item.

2. The method of claim 1, wherein transmitting the notification message to the plurality of mobile devices comprises broadcasting the notification message to the plurality of mobile devices.

3. The method of claim 1, further comprising:
determining a particular mobile device associated with the stored pattern data that defines the predetermined pattern detected in the at least one video content item; and
transmitting an alert message to the particular mobile device indicating transmission of at least one video content item of interest to the particular mobile device.

4. The method of claim 1, further comprising receiving, through a user interface, a selection of at least one identified logical event to indicate user interest in predetermined pattern data corresponding to the at least one identified logical event.

5. A method of filtering video content items on a mobile device, comprising:
receiving at least one notification message transmitted from a content provider to a plurality of mobile devices, wherein the at least one notification message comprises:
an identified pattern identifier and a channel identifier, wherein the identified pattern identifier is associated with pattern data comprising visual or audio characteristics of at least one video content item in current broadcast;
determining, on the mobile device, whether the identified pattern identifier matches a pattern identifier stored in the mobile device;
displaying the at least one notification message in response to determining that the identified pattern identifier matches a pattern identifier stored in the mobile device; and automatically tuning the mobile device to a channel associated with the channel identifier upon receiving the at least one notification message.

6. The method of claim 5, further comprising:
selecting, through an interface provided by a broadcast network, an identified logical event in a video content item; and
storing, in the mobile device, a pattern identifier associated with the identified logical event.

7. The method of claim 5, further comprising:
providing an interface for a user for tuning of the mobile device; and
in response to an input to the interface from the user, tuning the mobile device to the channel associated with the channel identifier.

8. A method of filtering video content items on a mobile device, comprising:
selecting, through an interface provided by a broadcast network, an identified logical event in a video content item, wherein the identified logical event is associated with an identified pattern comprising visual or audio characteristics of the video content item;
storing the identified pattern in the mobile device;
receiving an alert message transmitted to the mobile device and to a plurality of other mobile devices indicating current transmission of at least one video content item that contains visual or audio characteristics of a plurality of patterns respectively associated with a plurality of logical events;
displaying the alert message;
determining on the mobile device whether the identified pattern is included in the plurality of patterns; and
tuning the mobile device to a channel associated with the alert message in response to determining that the identified pattern is included in the plurality of patterns.

9. The method of claim 8, further comprising:
receiving a user input, wherein tuning the mobile device to a channel associated with the alert message is in response to the received user input.

10. The method of claim 8, wherein tuning the mobile device to the channel associated with the alert message comprises automatically tuning the mobile device in response to receiving the alert message.

11. An apparatus for providing video content items to a plurality of mobile devices, comprising:
a memory;
a display;
a user input device;
a network interface; and
a processor coupled to the memory, the display, the user input device, and the network interface, wherein the processor is configured with executable instructions to perform operations comprising:
storing a plurality of predetermined pattern identifiers and corresponding pattern data in a database, wherein the pattern identifiers and pattern data are generated by reference to data predictive of recipients' interest, and wherein the pattern data comprises visual or audio characteristics of video content items;
dynamically searching video content items in current broadcast for predetermined patterns defined by stored pattern data;
detecting a predetermined pattern in at least one video content item by determining that content of the at least one video content item in current broadcast has visual or audio characteristics matching stored pattern data; and
in response to detecting the predetermined pattern, transmitting a notification message of the at least one video content item to the plurality of mobile devices, wherein the notification message comprises:
a pattern identifier associated with the matching stored pattern data; and
a channel identifier associated with the at least one video content item of interest, wherein the notification message allows each of the plurality of mobile devices to:
determine whether the pattern identifier matches a user-selected pattern identifier stored in that mobile device; and
automatically tune to the at least one video content item.

12. The apparatus of claim 11, wherein the processor is configured with executable instructions to perform operations such that:
transmitting the notification message to the plurality of mobile devices comprises broadcasting the notification message to the plurality of mobile devices.

13. The apparatus of claim 11, wherein the processor is configured with executable instructions to perform operations further comprising:
determining a particular mobile device associated with the stored pattern data that defines the predetermined pattern detected in the at least one video content item,
transmitting an alert message to the particular mobile device indicating transmission of at least one video content item of interest.

14. The apparatus of claim 11, wherein the processor is configured with executable instructions to perform operations further comprising:
receiving through an interface a user selection of at least one identified logical event to indicate user interest in predetermined pattern data corresponding to the at least one identified logical event.

15. An apparatus for filtering video content items on a mobile device, comprising:
a memory;
a display;
a user input device;
a network interface; and
a processor coupled to the memory, the display, the user input device, and the network interface, wherein the processor is configured with executable instructions to perform operations comprising:
receiving at least one notification message transmitted from a content provider to a plurality of mobile devices, wherein the at least one notification message comprises:
an identified pattern identifier and a channel identifier, wherein the identified pattern identifier is associated with pattern data comprising visual or audio characteristics at least one video content item in current broadcast;
determining, on the mobile device, whether the identified pattern identifier matches a pattern identifier stored in the mobile device;
displaying the at least one notification message in response to determining that the identified pattern identifier matches a pattern identifier stored in the mobile device; and
automatically tuning the mobile device to a channel associated with the channel identifier upon receiving the at least one notification message.

16. The apparatus of claim 15, wherein the processor is configured with executable instructions to perform operations further comprising:
selecting, through an interface provided by a broadcast network, an identified logical event in a video content item; and
storing, in the mobile device, a pattern identifier associated with the identified logical event.

17. The apparatus of claim 15, wherein the processor is configured with executable instructions to perform operations further comprising:
tuning the mobile device to the channel associated with the channel identifier in response to an input from the user.

18. An apparatus for filtering video content items on a mobile device, comprising:
a memory;
a display;
a user input device;
a network interface; and
a processor coupled to the memory, the display, the user input device, and the network interface, wherein the processor is configured with executable instructions to perform operations comprising:
selecting, through an interface provided by a broadcast network, an identified logical event in a video content item, wherein the identified logical event is associated with an identified pattern comprising visual or audio characteristics of video content items;
storing the identified pattern in the memory;
receiving an alert message transmitted to the mobile device and to a plurality of other mobile devices indicating current transmission of at least one video content item that contains visual or audio characteristics of a plurality of patterns respectfully associated with a plurality of logical events;
displaying the alert message on the display;
determining on the mobile device whether the identified pattern is included in the plurality of patterns; and
tuning the mobile device to a channel associated with the alert message in response to determining that the identified pattern is included in the plurality of patterns.

19. The apparatus of claim 18, wherein the processor is configured with executable instructions to perform operations further comprising:
receiving user input, wherein tuning the mobile device to the channel associated with the alert message is in response to the received user input.

20. The apparatus of claim 18, wherein the processor is configured with executable instructions to perform operations such that tuning the mobile device to the channel associated with the alert message comprises automatically tuning the mobile device in response to receiving the alert message.

21. An apparatus for providing video content items to a plurality of mobile devices, comprising:
means for storing a plurality of predetermined pattern identifiers and corresponding pattern data, wherein the pattern identifiers and pattern data are generated by reference to data predicative of recipients' interest, and wherein the pattern data comprises visual or audio characteristics of the video content items;
means for dynamically searching video content items in current broadcast for predetermined patterns defined by the stored pattern data;
means for detecting a predetermined pattern in at least one video content item by determining that content of at least one video content item in current broadcast has visual or audio characteristics matching the stored pattern data; and
means for transmitting a notification message of the at least one video content item to the plurality of mobile devices in response to detecting the predetermined pattern detection, wherein the notification message comprises:
the pattern identifier associated with the matching stored pattern data; and
a channel identifier associated with the at least one video content item, wherein the notification message allows each of the plurality of mobile devices to:
determine whether the pattern identifier matches a user-selected pattern identifier stored in that mobile device; and
automatically tune to the at least one video content item.

22. The apparatus of claim 21, wherein means for transmitting a notification message of the at least one video content item to the plurality of mobile devices comprises means for broadcasting the notification message to the plurality of mobile devices.

23. The apparatus of claim 21, further comprising:
means for determining a particular mobile device associated with the stored pattern data that defines the predetermined pattern detected in the at least one video content item; and
transmitting an alert message to the particular mobile device indicating transmission of at least one video content item of interest.

24. The apparatus of claim 21, further comprising:
means for receiving through an interface a user selection of at least one identified logical event to indicate user interest in predetermined pattern data corresponding to the at least one identified logical event.

25. An apparatus for filtering video content items on a mobile device, comprising:
means for receiving at least one notification message transmitted from a content provider to a plurality of other mobile devices, wherein the at least one notification message comprises:
an identified pattern identifier and a channel identifier, wherein the identified pattern identifier is associated with pattern data comprising visual or audio characteristics of at least one video content item in current broadcast;
means for determining, on the mobile device, whether the identified pattern identifier matches a pattern identifier stored in the mobile device;
means for displaying the at least one notification message in response to determining that the identified pattern identifier matches a pattern identifier stored in the mobile device; and
means for automatically tuning the mobile device to a channel associated with the channel identifier upon receiving the at least one notification message.

26. The apparatus of claim 25, further comprising:
means for selecting, through an interface provided by a broadcast network, an identified logical event in a video content item; and
means for storing, in the mobile device, a pattern identifier associated with the identified logical event.

27. The apparatus of claim 25, further comprising:
means for providing an interface to tune the mobile device;
means for tuning the mobile device to the channel associated with the channel identifier in response to receiving user input to the interface.

28. An apparatus for filtering video content items on a mobile device, comprising:
- means for selecting, through an interface provided by a broadcast network, an identified logical event in a video content item, wherein the identified logical event is associated with an identified pattern comprising visual or audio characteristics of the video content items;
- means for storing the identified pattern;
- means for receiving an alert message transmitted to the mobile device and to a plurality of other mobile devices indicating current transmission of at least one video content item that contains visual or audio characteristics of a plurality of patterns respectively associated with a plurality of logical events;
- means for displaying the alert message;
- means for determining, on the mobile device, whether the identified pattern is included in the plurality of patterns; and
- means for tuning the mobile device to a channel associated with the alert message in response to determining that the identified pattern is included in the plurality of patterns.

29. The apparatus of claim 28, further comprising:
- means for receiving a user input, wherein the means for tuning the mobile device to the channel associated with the alert message is in response to the received user input.

30. The apparatus of claim 28, wherein the means for tuning comprises means for automatically tuning the mobile device to the channel associated with the alert message.

31. A non-transitory computer-readable storage medium having stored thereon processor-executable instructions configured to cause a processor of a broadcast network server to perform operations comprising:
- storing a plurality of predetermined pattern identifiers and corresponding pattern data, wherein the pattern identifiers and pattern data are generated by reference to data predictive of recipients' interest, and wherein the pattern data comprises visual or audio characteristics of video content items;
- dynamically searching video content items in current broadcast for predetermined patterns defined by stored pattern data;
- detecting a predetermined pattern in at least one video content item by determining that content of the at least one video content item in current broadcast has visual or audio characteristics matching stored pattern data; and
- in response to detecting the predetermined pattern, transmitting a notification message of the at least one video content item to a plurality of mobile devices, wherein the notification message comprises:
  - a pattern identifier associated with the matching stored pattern data; and
  - a channel identifier associated with the at least one video content item,
  - wherein the notification message allows each of the plurality of mobile devices to:
    - determine whether the pattern identifier matches a user-selected pattern identifier stored in that mobile device; and
    - automatically tune to the at least one video content item of interest.

32. The non-transitory computer-readable medium of claim 31, wherein the stored processor-executable instructions are configured to cause a processor of a broadcast network server to perform operations such that:
- transmitting the notification message of the at least one video content item to the plurality of mobile devices comprises broadcasting the notification message to the plurality of mobile devices.

33. The non-transitory computer-readable medium of claim 31, wherein the stored processor-executable instructions are configured to cause a processor of a broadcast network server to perform operations further comprising:
- determining a particular mobile device associated with the stored pattern data that defines the predetermined pattern detected in the at least one video content item; and
- transmitting an alert message to the particular mobile device indicating transmission of at least one video content item of interest.

34. The non-transitory computer-readable medium of claim 31, wherein the stored processor-executable instructions are configured to cause a processor of a video content provider to perform operations further comprising:
- receiving, from the user, through an interface, a selection of at least one identified logical event to indicate user interest in predetermined pattern data corresponding to the at least one identified logical event.

35. A non-transitory computer-readable storage medium having stored thereon processor-executable instructions configured to cause a processor of a mobile device to perform operations comprising:
- receiving at least one notification message transmitted from a content provider to a plurality of mobile devices, wherein the at least one notification message comprises:
  - an identified pattern identifier and a channel identifier, wherein the identified pattern identifier is associated with pattern data comprising visual or audio characteristics of at least one video content item in current broadcast;
- determining, on the mobile device, whether the identified pattern identifier matches a pattern identifier stored in the mobile device;
- displaying the at least one notification message in response to determining that the identified pattern identifier matches a pattern identifier stored in the mobile device; and
- automatically tuning the mobile device to a channel associated with the channel identifier upon receiving the at least one notification message.

36. The non-transitory computer-readable medium of claim 35, wherein the stored processor-executable instructions are configured to cause a processor of a mobile device to perform operations further comprising:
- selecting, through an interface provided by a broadcast network, an identified logical event in a video content item; and
- storing, in the mobile device, a pattern identifier associated with the identified logical event.

37. The non-transitory computer-readable medium of claim 35, wherein the stored processor-executable instructions are configured to cause a processor of a video content provider to perform operations further comprising:
- providing an interface for a user for tuning of the mobile device; and
- in response to an input to the interface from the user, tuning the mobile device to the channel associated with the channel identifier.

38. A non-transitory computer-readable storage medium having stored thereon processor-executable instructions configured to cause a processor of a mobile device to perform operations comprising:

selecting, through an interface provided by a broadcast network, an identified logical event in a video content item, wherein the identified logical event is associated with an identified pattern comprising visual or audio characteristics of the video content item;

storing the identified pattern in the mobile device;

receiving an alert message transmitted to the mobile device and to a plurality of other mobile devices indicating current transmission of at least one video content item that contains a plurality of patterns respectively associated with a plurality of logical events;

displaying the alert message;

determining, on the mobile device, whether the identified pattern is included in the plurality of patterns; and tuning the mobile device to a channel associated with the alert message in response to determining that the identified pattern is included in the plurality of patterns.

39. The non-transitory computer-readable medium of claim 38, wherein the stored processor-executable instructions are configured to cause a processor of a mobile device to perform operations further comprising:

receiving a user input, wherein tuning the mobile device to a channel associated with the alert message is in response to the received user input.

40. The non-transitory computer-readable medium of claim 38, wherein the stored processor-executable instructions are configured to cause a processor of a mobile device to perform operations such that:

tuning the mobile device to the channel associated with the alert message comprises automatically tuning the mobile device in response to receiving the alert message.

41. A system for filtering video content items for a plurality of mobile devices, comprising:

a content provider server, comprising:

means for storing a plurality of pattern identifiers and associated pattern data, wherein the pattern data is generated by reference to data predictive of recipients' interest, and wherein the pattern data comprises visual or audio characteristics of video content items;

means for dynamically searching video content items in current broadcast for predetermined patterns defined by stored pattern data;

means for detecting a predetermined pattern in at least one of the video content items in current broadcast based on detecting visual or audio characteristics matching stored pattern data; and means for transmitting a notification message to the plurality of mobile devices, wherein the notification message comprises the pattern identifier associated with the matching stored pattern data; and a mobile device, comprising:

means for storing a plurality of user-selected pattern identifiers;

means for receiving the notification message from the content provider server;

means for determining whether the pattern identifier in the received notification message matches one of the user-selected pattern identifiers stored in the mobile device; and means for automatically tuning the mobile device to a channel associated with the at least one of the video content items in a current broadcast in response to determining that the pattern identifier in the received notification message matches one of the user-selected pattern identifiers stored in the mobile device.

42. A system for filtering video content items for a plurality of mobile devices, comprising:

a wireless communication network;

a content provider server, comprising:

a network interface configured to connect to the wireless communication network;

a memory; and a processor coupled to the memory and the network interface, wherein the processor is configured with processor-executable instructions to perform operations comprising:

storing a plurality of pattern identifiers and associated pattern data, wherein the pattern data is generated by reference to data predictive of recipients' interest, and wherein the pattern data comprises visual or audio characteristics of video content items;

dynamically searching video content items in current broadcast for predetermined patterns defined by stored pattern data;

detecting a predetermined pattern in at least one of the video content items in current broadcast based on detecting visual or audio characteristics matching stored pattern data; and transmitting a notification message to the plurality of mobile devices, wherein the notification message comprises the pattern identifier associated with the matching stored pattern data; and a mobile device comprising:

a user interface;

a memory;

a network interface configured to connect to the wireless communication network; and a processor coupled to the user interface, the memory, and the network interface, wherein the processor is configured with processor-executable instructions to perform operations comprising:

storing user-selected pattern identifiers;

receiving the notification message from the content provider server;

determining whether the pattern identifier in the received notification message matches one of the stored user-selected pattern identifiers; and automatically tuning the mobile device to a channel associated with the at least one of the video content items in current broadcast in response to determining that the pattern identifier in the received notification message matches one of the stored user-selected pattern identifiers.

* * * * *